United States Patent Office 3,712,846
Patented Jan. 23, 1973

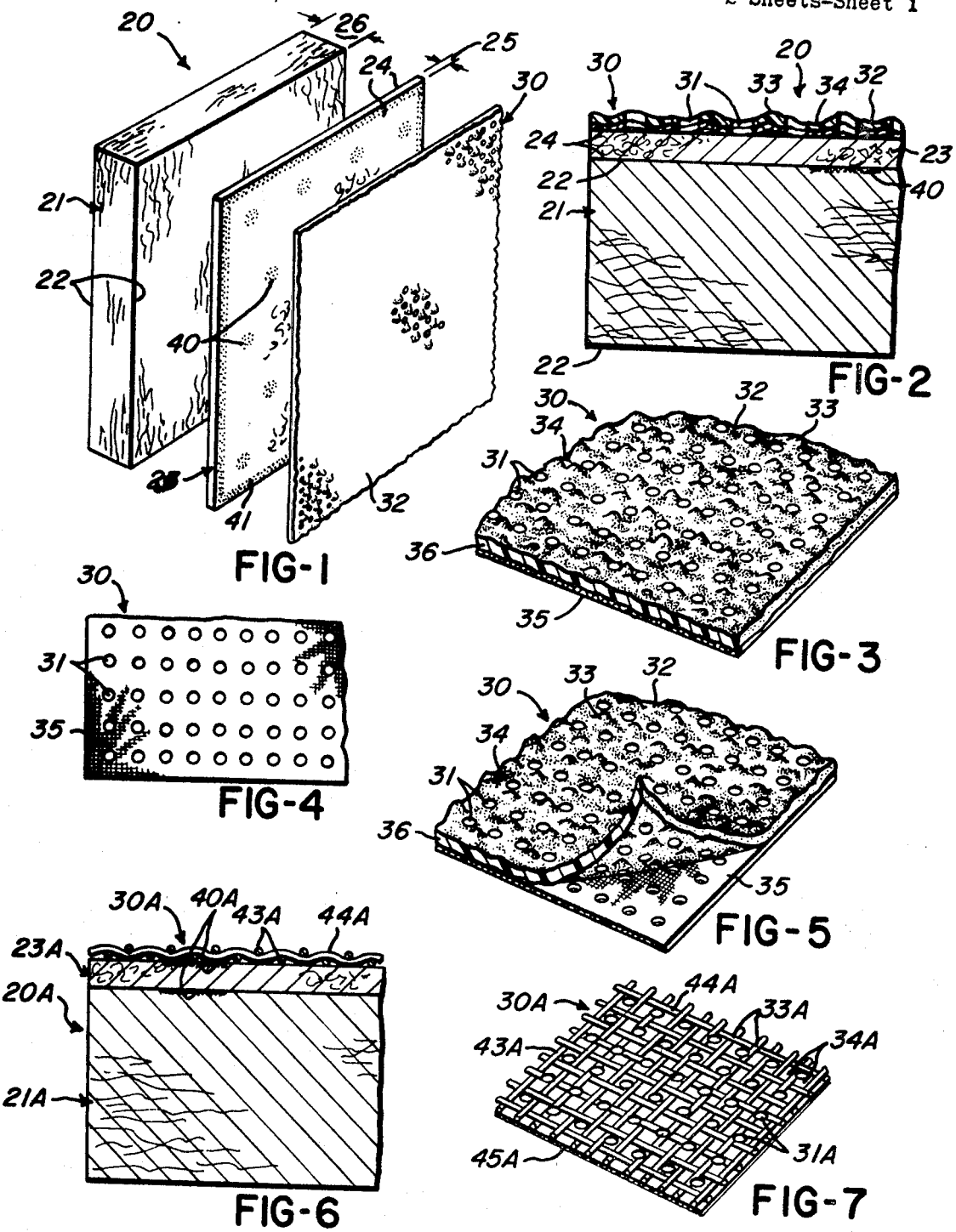

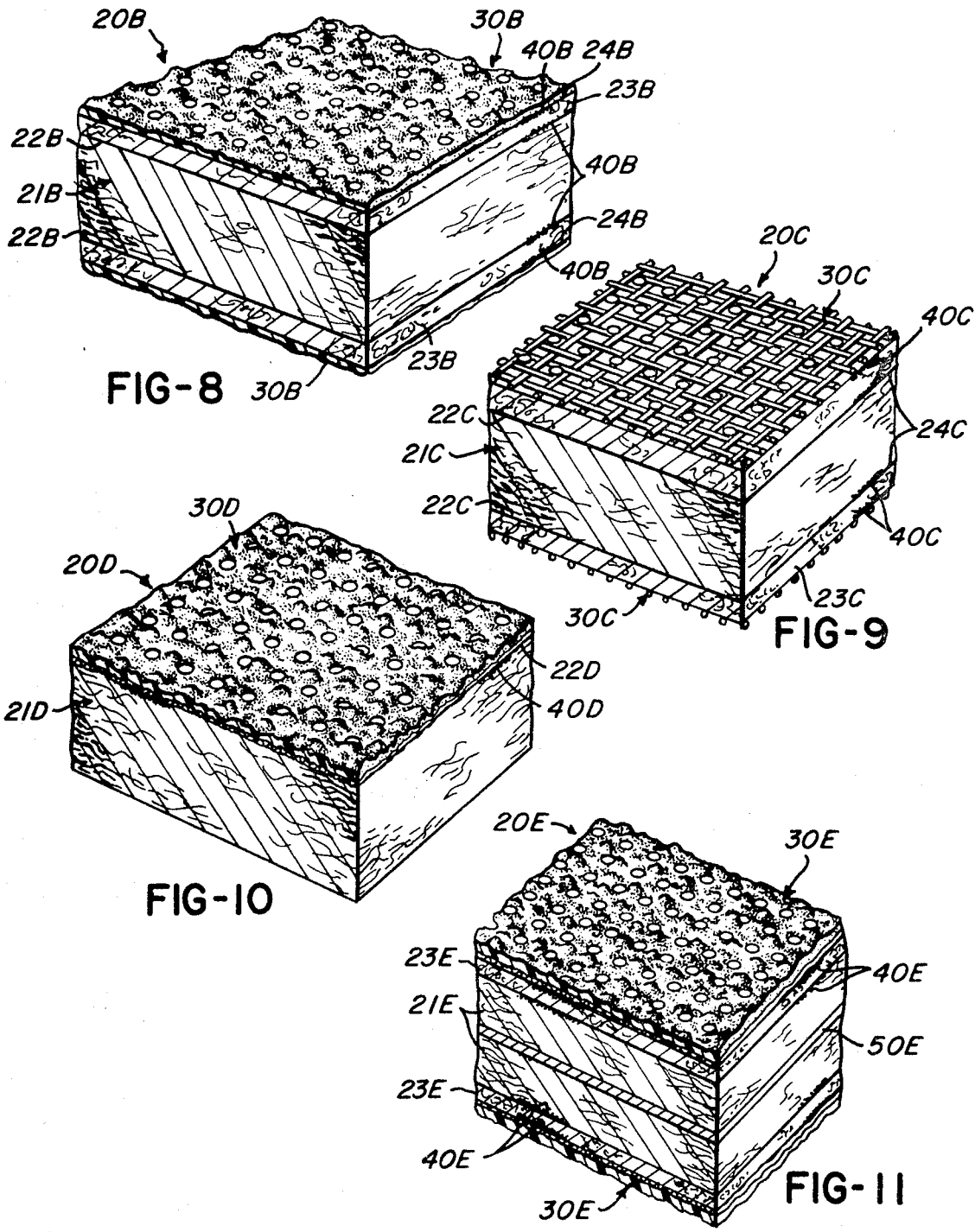

3,712,846
ACOUSTICAL PANEL
William M. Daniels, Hackettstown, and Richard A. Borton, Mountain Lakes, N.J., assignors to L. E. Carpenter & Company, Wharton, N.J.
Filed June 23, 1971, Ser. No. 155,954
Int. Cl. C04b 43/02; E04b 1/74
U.S. Cl. 161—43                                    16 Claims

ABSTRACT OF THE DISCLOSURE

An acoustical panel is provided and comprises a sound absorbing and insulating main body having uninterrupted opposed planar surfaces and a substantially uniform density throughout and at least one hard porous member also having uninterrupted opposed planar surfaces and a substantially uniform density throughout bonded to one of the planar surfaces of the main body. The member has a higher density than the density of the main body and a thickness which is less than the thickness of such main body with the member being air pervious and allowing sound waves to be transmitted therethrough. The panel also has a flexible outer covering having a plurality of openings therethrough which is bonded to the exposed planar surface of the member with the covering having a thickness which is less than the thickness of the member and a roughened outside surface defined by projections and indentations which serve as miniature sound baffles.

BACKGROUND OF THE INVENTION

Numerous acoustical panel constructions have been proposed heretofore for use in making furniture, room dividers, partitions, wall constructions, ceiling constructions, and the like. However, many previously proposed panel constructions are deficient because they are either too expensive to produce economically, provide poor performance, require substantial modifications of standard designs at increased costs, or require forming and precise alignment during fabrication of controlled openings and cavities in cooperating components comprising a panel construction.

SUMMARY

This invention provides an improved acoustical panel of simple and economical construction which overcomes the deficiencies of many of the previously proposed acoustical panel constructions. The acoustical panel comprises a sound absorbing and insulating main body having uninterrupted opposed planar surfaces and a substantially uniform density throughout and at least one hard porous member also having uninterrupted opposed planar surfaces and a substantially uniform density throughout bonded to one of the planar surfaces of the main body. The member has a higher density than the density of the main body and a thickness which is less than the thickness of such main body with the member being air pervious and allowing sound waves to be transmitted therethrough. A flexible outer covering having a plurality of openings therethrough is provided and bonded to the exposed planar surface of the member with the covering having a thickness which is less than the thickness of the member and a roughened outside surface defined by projections and indentations which serve as miniature sound baffles.

Other details, uses, and advantages of this invention will be readily apparent from the exemplary embodiments thereof presented in the following specification, claims, and drawings.

BRIEF DESCRIPTION OF THE DRAWINGS

The accompanying drawings show present preferred embodiments of this invention, in which FIG. 1 is an exploded perspective view illustrating the various components comprising one exemplary embodiment of an acoustical panel of this invention;

FIG. 2 is a fragmentary cross-sectional view illustrating the components of FIG. 1 in assembled relation;

FIG. 3 is an enlarged fragmentary perspective view of the outer covering comprising the panel of FIG. 2 illustrating projections and indentations in the plastic comprising the outside surface of such outer covering;

FIG. 4 is a fragmentary view looking perpendicular to the bottom surface of the covering shown in FIG. 3 to illustrate a plurality of openings extending through such covering;

FIG. 5 is an enlarged fragmentary perspective view of a portion of the covering of FIG. 3 with a corner portion of the integrally bonded outer plastic lifted upwardly to show a woven fabric layer comprising such covering;

FIG. 6 is a fragmentary cross-sectional view similar to FIG. 2 illustrating another exemplary embodiment of the panel of this invention wherein the outer covering is made of woven material having warps and wefts defining projections comprising the outside surface of such covering;

FIG. 7 is a view similar to FIG. 3 particularly illustrating the detailed construction of the woven material defining the covering of the panel of FIG. 6; and FIGS. 8, 9, 10, and 11 respectively are fragmentary perspective views with parts in cross section illustrating four other exemplary embodiments of the panel of this invention.

DESCRIPTION OF ILLUSTRATED EMBODIMENTS

Reference is now made to FIGS. 1 and 2 of the drawings which illustrate one exemplary embodiment of an acoustical panel of this invention which is designated generally by the reference numeral 20. The panel 20 comprises a sound absorbing and insulating main body 21 having a pair of parallel uninterrupted opposed planar surfaces each designated by the reference numeral 22 and main body 21 also has a substantially uniform density throughout. The panel 20 also comprises a hard porous member 23 also having a pair of parallel uninterrupted opposed planar surfaces each designated by the reference numeral 24 and a substantially uniform density throughout with the member 23 having one of its planar surfaces 24 bonded or laminated against an associated planar surface 22 of the main body 21 and in a manner to be described in detail subsequently.

The member 23 has a density which is substantially higher than the density of the main body 21 and a thickness indicated at 25 which is less than the thickness 26 of the main body 21; and, the thickness 25 is only a small fractional part of the thickness 26. The member 23 though of uniform density throughout, is air pervious and allows sound waves to be transmitted therethrough so that they may be readily absorbed in the main body 21.

The panel 20 also comprises a flexible outer covering 30 which has a plurality of spaced openings 31 extending therethrough and such covering is bonded, in a manner to be subsequently described, to an exposed planar surface 24 of the member 23. The covering 30 has a thickness which is substantially less than the thickness of the member 23 and has a roughened or textured outside surface which is designated generally by the reference numeral 32.

The outside surface 32 is defined by projections 33 and indentations 34 which serve as miniature sound baffles while the openings 31 allow sound waves to readily pass through the covering 30 toward the member 23 and the main body 21. The covering 30 and roughened outside surface 32 has optimum durability whereby the panel 20 may be used in applications such as screens, partitions, wall panels, etc., which are subject to wear; further, such covering is easily washed and maintained whereby its outside appearance is highly decorative and maintained in an optimum condition for extended time periods.

The main body 21 and member 23 may be made of any suitable acoustical material known in the art and preferably are made of mineral wool comprising rock, slag, or glass fibers. The main body 21 and member 23 are each preferably made of glass fibers which are bonded together in an air porous mass with a suitable binder which is fire resistant. One example of a binder which has been successfully used for this purpose is a melamine-phenol formaldehyde resin.

The main body 21 and member 23 were each previously referred to as having uninterrupted opposed planar surfaces (22 and 24 respectively) and this means, such surfaces are free of recesses, cavities, protrusions, indentations, or the like. Also, while members 21 and 23 are previous to air flow therethrough, they each have a substantially uniform density throughout. With member or main body 21 made of fiber glass, its density may range between two and six pounds per cubic foot and depending upon the application of the panel 20, it may have a thickness ranging between 1 to 6 inches or more. With member 23 made of fiber glass, its density may range between 16 and 44 pounds per cubic foot and it may have a thickness ranging between $\frac{1}{16}$ to $\frac{1}{4}$ inch or more depending upon the application; however, even with these densities and thicknesses, the member 23 still allows sound waves to be transmitted therethrough in a substantially unobstructed manner while serving as a substantially rigid supporting base for the covering 30.

As seen particularly in FIGS. 3 and 5, the covering 30 comprises a woven backing 35 which may be made of any suitable material and may be impregnated with a suitable elastomeric material. A plastic in the form of a vinyl plastic 36 is bonded against the backing 35 and the plastic 36 may be molded thereagainst so the covering 30 is defined essentially as a single unit. The plastic 36 is molded so that it has projections 33 and indentations 34 formed therein in a rundown manner; and, the projections 33 and indentations 34 define the roughened outside surface 32.

The openings 31 extending through the covering 30 are provided in space relation and preferably in a geometric pattern. The openings 31 are shown as being of circular cross-sectional outline; however, it will be appreciated that such openings may be of any suitable non-circular cross-sectional configuration.

To assure that sound waves may travel through the covering 30 in an unobstructed manner, the openings 31 are provided so that they comprise between 5% and 30% of the projected planar area of the cover 30, i.e., between 5% and 30% of the area defined by the peripheral outline of the covering 30 when looking normal to planar surface 24 of supporting member 23 for such covering.

The main body 21 and member 23 may be bonded together using any suitable adhesive capable of bonding the various materials comprising components 21 and 23; and, such adhesive may be applied as a thin coating on either or both of the associated surfaces 22 or 24. However, it has been found that optimum results are obtained when the adhesive is applied in a predetermined pattern over only a small fractional part of the surface areas which are to be brought into face to face contact. In one application, satisfactory results were obtained with only 5 percent of the associated surface 24 of member 23 covered with adhesive applied against surface 24 in a series of spaced small area patches or spots of adhesive each designated by the reference numeral 40 and the spots were applied so that each had a circular outline.

In a similar manner, the outer covering 30 may be bonded to member 23 using a light coating of adhesive; however, such covering is preferably bonded or fixed in position utilizing spots of adhesive each also designated by the reference numeral 40 and occupying only a small fractional part of the inside surface area of the covering 30. In one application, the spots of adhesive 40 between covering 30 and member 23 were applied against the associated inside surface 24 of member 23 and covered approximately 5 percent of such surface.

It has been found that by applying adhesive in comparatively widely spaced spots 40 the adhesive provides minimum obstruction to sound waves attempting to enter the main body 21. It may also be preferred in some applications of this invention to provide a peripheral strip 41 of adhesive on the surface 24 of member 23 adjoining covering 30 to prevent the peripheral edges of covering 30 from pulling away from member 23.

Other exemplary embodiments of panels of this invention are illustrated in FIGS. 6-7, 8, 9, 10, and 11. The panels illustrated in FIGS. 6-7, 8, 9, 10, and 11 are similar to the panel 20; therefore, such panels will be designated by the reference numerals 20A, 20B, 20C, 20D, and 20E respectively and representative parts of each panel which are similar to corresponding parts of the panel 20 will be designated in the drawings by the same reference numeral as in the panel 20 (whether or not such components are mentioned in the specification) followed by an associated letter designation, either A, B, C, D, or E and not described again in detail. Only those component parts of each panel which are different from corresponding parts of the panel 20 will be designated by a new reference numeral also followed by the associated letter designation and described in detail.

The panel 20A of FIGS. 6 and 7 has an outer covering 30A comprised of a woven material having comparatively widely spaced apart warps 43A and wefts 44A defining the projections 33A and each volume bounded by a pair of immediately adjacent warps and a pair of immediately adjacent wefts defines one of the plurality of indentations 34A. The woven material may be made of any suitable material and is preferably bonded against a plastic backing 45A to define the covering 30A as a single integral unit. The covering 30A is bonded by spaced adhesive spots 40A to member 23A and the member 23A is in turn bonded by spots of adhesive 40A to the main body member 21A.

The panel 20A with its covering 30A also provides optimum performance and the spaced openings 31A are provided in covering 30A in a similar manner as in the panel 20 and for the same purpose of allowing sound waves to pass through such covering. Further, the projections 33A defined by the warps 33A and wefts 34A cooperate with the indentations 34A to define miniature sound baffles for the covering 30A and panel 20A.

The panel 20B of FIG. 8 is substantially identical to the panel 20 except for the fact that it has a pair of members 23B bonded against opposed planar surfaces 22B of the main body 21B by spaced adhesive spots 40B. A pair of outer coverings 30B are provided and each is bonded against an outside planar surface 24B of an associated member 23B also using spaced adhesive spots 40B.

The panel 20C of FIG. 9 is similar to the panel 20B in that it also has a main body 21C provided with opposed planar surfaces 22C against which a pair of members 23C are bonded using adhesive spots 40C. The panel 20C has a pair of outer coverings 30C with each covering 30C being substantially identical to the outer covering 30A illustrated in FIG. 6. Each outer covering 30C is also bonded against an associated planar surface of a member 23C utilizing spaced adhesive spots 40C.

The panels 20B and 20C may be employed in applications such as room dividers, privacy screens, portable partitions, and the like, when both surfaces of each panel may be viewed. These panels also provide improved performance in a similar manner as panels 20 and 20A.

The panel 20D, illustrated in FIG. 10, comprises a main body 21D having opposed planar surfaces 22D and a covering 30D (which is identical to the covering 30) bonded directly against one of the surfaces 22D of the main body 21D. The covering 30D is also preferably bonded by spaced spots of adhesive 40D. The panel 20D is used in applications where it is not necessary to provide optimum structural strength for such panel.

The panel 20E of FIG. 11 is substantially identical to the panel 20B and in addition to the main body 21E and a pair of members 23E adhesively bonded by spots 40E on opposite surfaces 22E and body 21E has a sheet 50E of a metallic material (lead, for example) provided in the central portion of its main body 21E. The sheet 50E may be suitably formed in position during the process of adhesively bonding particles of fiber glass which define the main body 21E or sheet 50E may be inserted and laminated in sandwiched relation between a pair of cooperating sheets comprising the main body 21E.

The panel 20E may be used in applications wherein a sound absorbing panel and special shield is required. Thus, in a laboratory using an X-ray machine, the panel 20E may use a sheet 50E made of lead to shield the operator of the X-ray machine against an over exposure to X-rays.

As previously indicated, the main body of a particular panel such as the panel 20, for example, may have a thickness 26 ranging between 1 to 6 inches while being of uniform density throughout; and, the member 23 may have a thickness 25 ranging between 1/16 and 1/4 inch. Successful results have been obtained using a main body having a thickness of one inch and a member 23 having a thickness 1/8 inch. The outer covering for this panel had an overall thickness of roughly 1/32 of an inch.

The outer covering of each exemplary panel 20 of this invention may be of any suitable construction; however, such covering is preferably a perforated decorative material, is wear resistant, may be easily washed and maintained, and has projections and indentations (defining a roughened outside surface) which serve as miniature sound baffles. One example of a unique covering meeting these requirements and which has been successfully employed is manufactured by L. E. Carpenter & Co., a division of the Dayco Corporation, Wharton, N.J. 07885, and is sold under the trade name of Vicrtex. Optimum results were obtained in one application using Vicrtex covering which had openings defining 27 percent of the surface area of its comparatively smooth back surface.

The adhesive which may be used between the main body portion and associated members and/or covering of each panel may be of any suitable type. One example of an adhesive successfully used between an outer Vicrtex covering and its adjoining member is an acrylic water base type adhesive made by Acme Adhesive Company, Maywood, N.J., and sold under the trade designation of Acme 284. An example of an ahesive successfully used between the main body portion and an adjoining intermediate member is an SBR emulsion type adhesive sold by the Chicago Adhesive Company, Chicago, Ill., under the trade designation Chatko No. 500.

While present exemplary embodiments of this invention, and methods of practicing the same, have been illustrated and described, it will be recognized that this invention may be otherwise variously embodied and practiced within the scope of the following claims.

What is claimed is:

1. An acoustical panel comprising, a sound absorbing and insulating main body having a pair of uninterrupted opposed planar surfaces and a substantially uniform density throughout, at least one hard porous member having uninterrupted opposed planar surfaces and a substantially uniform density throughout, said member having one of its planar surfaces bonded to an associated one of the planar surfaces of said main body and having a higher density than the density of said main body and a thickness which is less than the thickness of said main body, said member being air pervious and allowing sound waves to be transmitted therethrough, and a flexible outer covering having a plurality of openings therethrough and being bonded to the other of said planar surfaces of said member, said covering having a thickness which is less than the thickness of said member and having a roughened outside surface defined by projections and indentations which serve as miniature sound baffles.

2. A panel as set forth in claim 1 in which said outer covering comprises a vinyl plastic material having said projections and identations formed as an integral part thereof in a random manner.

3. A panel as set forth in claim 1 in which said outer covering comprises a woven backing material having a vinyl plastic bonded thereto with said projections and indentations being formed in said vinyl plastic in a random manner.

4. A panel as set forth in claim 1 in which said otuer covering comprises a woven material having comparatively widely spaced apart warps and wefts defining said projections and the volume bounded by a pair of immediately adjacent warps and a cooperating pair of immediately adjacent wefts defining one of said plurality of indentations.

5. A panel as set forth in claim 4 in which said woven material is bonded against a plastic backing to define a single integral unit.

6. A panel as set forth in claim 1 in which said plurality of openings in said flexible outer covering comprise between five and thirty percent of the total projected plan area thereof.

7. A panel as set forth in claim 6 and further comprising an adhesive bonding said outer covering to said other of said planar surfaces of said member, said adhesive being applied to said other planar surface over a small fractional part of its surface area.

8. A panel as set forth in claim 6 and further comprising adhesive spots bonding said outer covering to said other of said planar surfaces of said member and being arranged at spaced intervals with the total surface area occupied by said adhesive spots comprising roughly five percent of the total area of said other planar surface.

9. A panel as set forth in claim 1 in which said main body is made of a porous mass of bonded glass fibers and said member is made of a porous mass of bonded glass fibers having said higher density.

10. A panel as set forth in claim 9 in which said main body has a density ranging between two and six pounds per cubic foot and said member has a density ranging between 16 and 44 pounds per cubic foot.

11. A panel as set forth in claim 10 in which the glass fibers in said main body and said member are bonded together by a fire resisting binder.

12. A panel as set forth in claim 1 and further comprising another member which is substantially identical to said one member bonded to said main body against the other of the opposed planar surfaces of said main body and another flexible outer covering which is substantially identical to said first-named outer covering bonded to an associated planar surface of said other member.

13. A panel as set forth in claim 12 and further comprising a sheet of metallic material provided in the central portion of said main body.

14. A panel as set forth in claim 12 in which said main body and said pair of members each comprises a porous mass of bonded glass fibers.

15. A panel as set forth in claim 14 in which each of said outer coverings comprises a vinyl plastic material having projections and indentations formed therein as an integral part thereof.

16. A panel as set forth in claim 14 in which each of said outer coverings comprises a woven material having comparatively widely spaced apart warps and wefts defining the projections therein and the volume bounded by a pair of immediately adjacent warps and a cooperating pair of immediately adjacent wefts defines one of the plurality of indentations.

References Cited

UNITED STATES PATENTS

| | | | |
|---|---|---|---|
| 3,021,914 | 2/1962 | Wilson | 161—443 X |
| 2,998,337 | 8/1961 | Tillotson | 161—113 X |
| 2,825,420 | 3/1958 | Heine | 181—33 GA |
| 2,602,037 | 7/1952 | Nelb | 161—93 |
| 1,867,797 | 7/1932 | Armstrong | 181—33 R |
| 2,096,233 | 10/1937 | Ericson | 181—33 R |
| 2,944,622 | 7/1960 | Dobbins | 181—33 R |
| 2,994,401 | 8/1961 | Bourne et al | 161—43 X |
| 3,215,225 | 11/1965 | Kirschner | 161—43 X |
| 3,230,375 | 1/1966 | Wagoner et al. | 161—41 X |
| 3,630,817 | 12/1971 | Winkowski | 161—41 X |
| 3,675,377 | 7/1972 | Suter | 161—43 X |

HAROLD ANSHER, Primary Examiner

U.S. Cl. X.R.

161—93, 113, 116, 124, 125, 148, 155, 164, 166; 181—33 G